United States Patent
Grzemski

(10) Patent No.: US 6,412,733 B1
(45) Date of Patent: Jul. 2, 2002

(54) SUPPORT BRACKETS FOR CABLE RACEWAY

(75) Inventor: Chester F. Grzemski, Plainfield, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/873,853

(22) Filed: Jun. 4, 2001

(51) Int. Cl.[7] .................................................. F16L 3/00
(52) U.S. Cl. ........................ 248/49; 248/218.4; 248/235
(58) Field of Search ............................ 248/49, 65, 73, 248/219.4, 218.4, 220.21, 68.1, 235; 108/108

(56) References Cited

U.S. PATENT DOCUMENTS

| | | | |
|---|---|---|---|
| 3,036,801 A | 5/1962 | Cemashko | |
| 3,158,349 A | * 11/1964 | Bergstrom | 248/343 |
| 3,923,277 A | 12/1975 | Perrault et al. | 248/49 |
| 3,966,056 A | 6/1976 | Larson | |
| 4,538,782 A | 9/1985 | Kirschenbaum | 248/68.1 |
| 4,793,580 A | 12/1988 | Richards | 248/65 X |
| 4,960,253 A | 10/1990 | Perrault et al. | 248/68.1 |
| 5,062,605 A | * 11/1991 | Muhlethaler | 248/68.1 |
| 5,274,888 A | 1/1994 | Payne | |
| 5,316,244 A | 5/1994 | Zetena, Jr. | 248/49 |
| 5,351,920 A | 10/1994 | Decky et al. | 248/73 |
| 5,503,354 A | 4/1996 | Lohf et al. | 248/68.1 X |
| 6,254,041 B1 | * 7/2001 | Dufourg | 248/65 |

OTHER PUBLICATIONS

Panduit Brochure, Network Connectivity Systems 2001, pp. 63 and 64.

* cited by examiner

*Primary Examiner*—Ramon O. Ramirez
(74) *Attorney, Agent, or Firm*—Robert A. McCann

(57) ABSTRACT

A support bracket assembly affixes and supports various cable duct raceway sections and is mountable to a rod, which may be affixed to various support structures such as a support bar or ladder rail. The bracket assembly includes a support bracket and a support element fixedly positionable on the rod. The bracket assembly includes a substantially planar support surface of a predetermined length with two longitudinal edges and two ends, a substantially planar flange surface substantially parallel to and spaced from the support surface and having a longitudinal edge on a same side as a first longitudinal edge of the support surface, and a connecting surface that connects the support surface and the flange surface. A first opening is provided on the planar support surface near one of the two ends. The first opening extends inward from the first longitudinal edge of the support surface and is sized to receive a rod. The first opening defines at least a rear contact surface and a side contact surface. A second opening is provided on the flange surface. The second opening extends inward from the longitudinal edge of the flange surface and is also sized to receive the rod. The second opening defines at least a front contact surface and a side contact surface. The first and second openings at least partially overlap to define a through hole sized to receive the rod. The support element is sized larger than the through hole and is fixedly positioned on the rod so that the support bracket rests on the support element. The support surface may include one or more mounting clamps that receive an object such as a cable duct raceway section. The support element may be one or more split nuts.

20 Claims, 4 Drawing Sheets

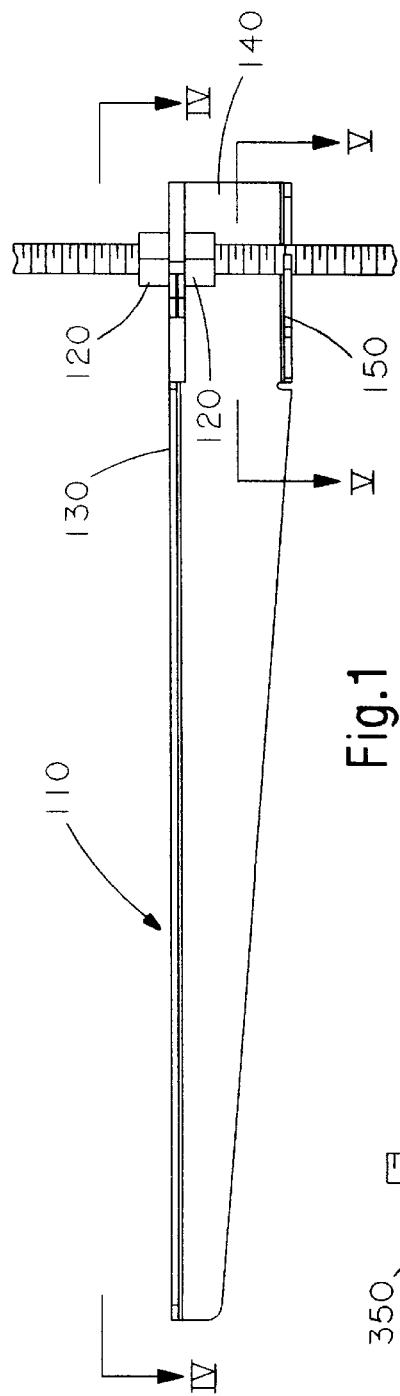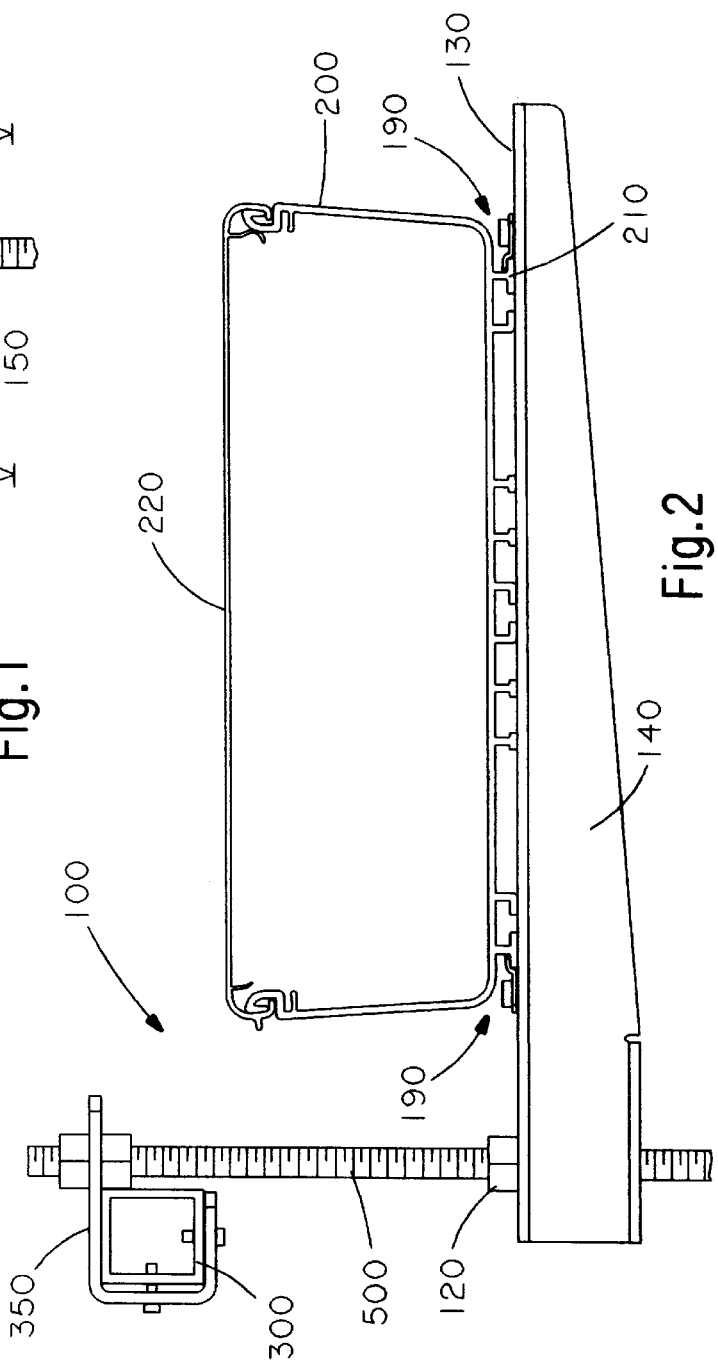

SUPPORT BRACKETS FOR CABLE RACEWAY

BACKGROUND OF THE INVENTION

1. Field of Invention

The present invention generally relates to a support bracket assembly. More particularly, the invention relates to a support bracket assembly that affixes and supports various cable duct raceway sections and is mountable to a rod, which may be affixed to various support structures such as a support bar or ladder rail.

2. Description of Related Art

A variety of cable raceway systems and brackets are known for supporting sections of cable ducts, which route and protect fiber optic or metal cabling to and between equipment racks within a telecommunications room or service provider facility. However, many of these conventional brackets can only be used for a new installation and require a complete or at least partial disassembly of parts of a support structure before additional sections can be added. That is, many of these brackets cannot be easily retrofit into an existing support structure. As such, installation with such brackets requires much additional time for a cable installer.

Furthermore, certain known support and mounting brackets suffer from an inability to provide adequate horizontal support and cannot support heavy loads.

Certain known support and mounting brackets also suffer from requiring a multiplicity of parts and an inability to achieve quick installation.

SUMMARY OF THE INVENTION

It is an object of the invention to provide an improved support bracket assembly that can be retrofit into an existing mounting structure.

It is another object of the invention to provide an improved support bracket assembly that can provide sufficient support.

It is another object of the invention to provide a support bracket assembly that can be readily installed.

Various ones of the above and other objects are achieved by a bracket assembly mountable on a rod and providing a support surface for an object. The bracket assembly includes a support bracket and a support element fixedly positionable on the rod. The bracket assembly includes a substantially planar support surface of a predetermined length with two longitudinal edges and two ends, a substantially planar flange surface substantially parallel to and spaced from the support surface and having a longitudinal edge on a same side as a first longitudinal edge of the support surface, and a connecting surface that connects the support surface and the flange surface. A first opening is provided on the planar support surface near one of the two ends. The first opening extends inward from the first longitudinal edge of the support surface and is sized to receive a rod of a predetermined width. The first opening defines at least a rear contact surface and a side contact surface. A second opening is provided on the flange surface. The second opening extends inward from the longitudinal edge of the flange surface and is also sized to receive the rod. The second opening defines at least a front contact surface and a side contact surface. The first and second openings at least partially overlap to define a through hole sized to receive the rod. The support element is sized larger than the through hole and is fixedly positioned on the rod so that the support bracket rests on the support element. The support surface may include one or more mounting clamps that receive an object such as a cable duct raceway section. The support element may be one or more split nuts.

BRIEF DESCRIPTION OF THE DRAWINGS

The foregoing and further objects, features and advantages of the present invention will become apparent from the following description of preferred embodiments with reference to the accompanying drawings, wherein:

FIG. 1 is a side view of a support bracket mounted in a fully assembled position on a threaded rod according to an embodiment of the invention;

FIG. 2 is an opposite side view of the support bracket of FIG. 1 connected to a support bar and having a cable raceway section affixed thereon;

DETAILED DESCRIPTION OF PREFERRED EMBODIMENTS

Figure 6:
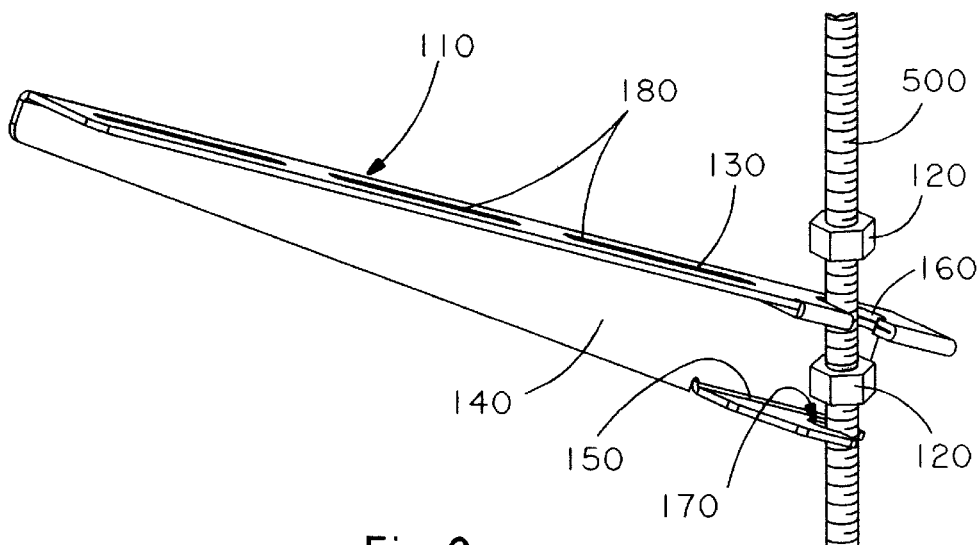
FIG. 6 is a perspective view of the support bracket and rod of FIG. 1 in an initial assembly position.
Figure 7:
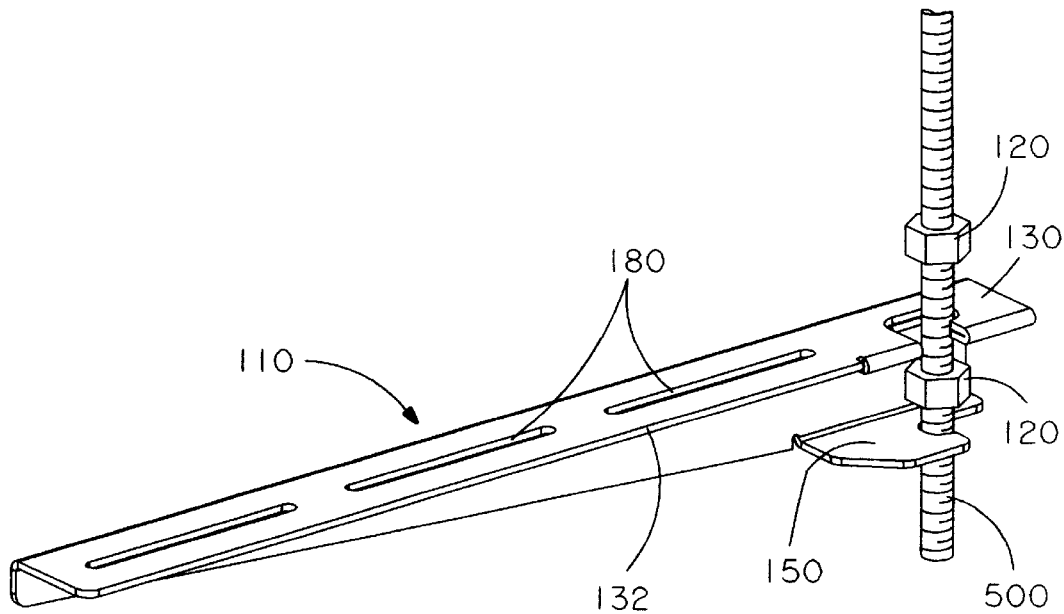
FIG. 7 is a perspective view of the support bracket and rod of FIG. 1 in an intermediate assembly position.
Figure 8:
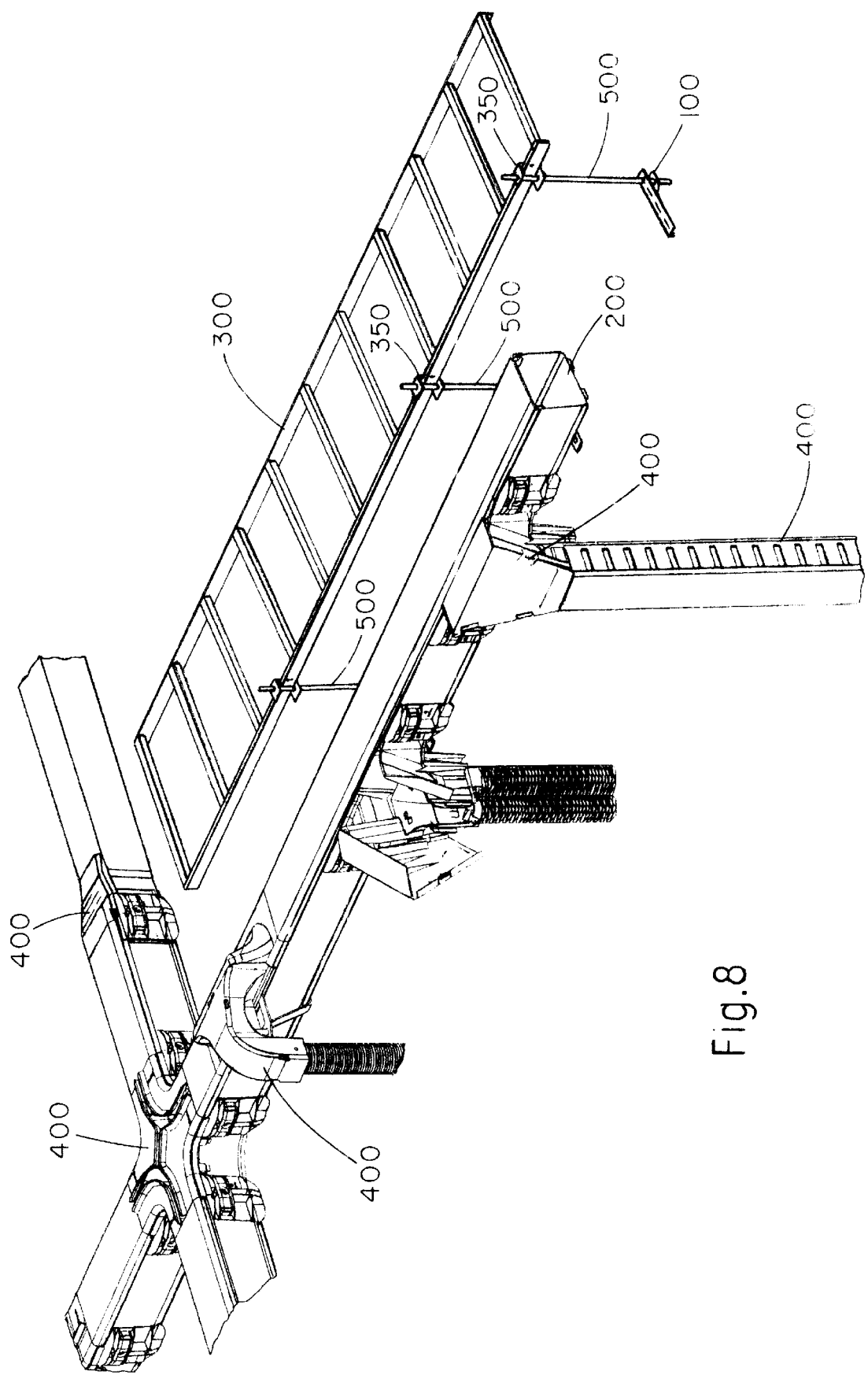
FIG. 8 is a perspective view of a cable duct raceway system mounted to a ladder rack using various support brackets according to the invention.

An embodiment of a support bracket according to the invention will be described with reference to FIGS. 1–8. A support bracket assembly 100 mounts one or more cable raceway sections 200 to a support structure 300, such as the support bar in FIG. 2 or the ladder rail of FIG. 8. The support structure 300 may also form part of a network rack. The cable raceway sections 200 are used to route and manage fiber optic cables entering and exiting a network distribution frame, splice enclosure or other equipment as best shown in FIG. 8 where sections of raceway 200 are interconnected by various combinations of fittings 400.

Referring back to FIGS. 1–2, support bracket assembly 100 is mountable to a rod, such as threaded rod 500. Threaded rod 500 may be attached to a support structure 300 by any of various conventional bracket structures 350. In the exemplary embodiment shown, support structure 300 is a section of metal framing which may be of a variety of known types. Bracket structure 350 in this example is a bracket part no. FTRB12 or FTRB58 available from Panduit Corporation of Tinley Park, Ill. Another example of bracket structure is shown in FIG. 8, where a mounting bracket 360 mounts the rod to a ladder rail. Mounting bracket 360 in this example is part no. FLB12X15 available from Panduit Corporation of Tinley Park, Ill. which mounts to a 1½" ladder rail. However, attachment of rod 500 to a resultant support structure can take any form.

Bracket assembly 100 includes a support bracket 110 and one or more support elements, such as mounting nuts 120. Bracket 110 is preferably formed as a unitary piece from a suitable rigid and strong material such as, for example, steel, aluminum, PVC plastic, ABS plastic, or the like. Bracket assembly is appropriately sized depending on the particular application and object to be supported. In the case of cable duct raceways 200 as shown in FIG. 2, bracket assembly 100 is preferably sized to receive either a 6"×4" or 12"×4" duct section or both. However, the length and dimensions of bracket 110 may be altered depending on application. While other sizes can be used, a suitable rod used in existing systems is a threaded ½" or ⅝" rod of a desired length.

Figure 3:
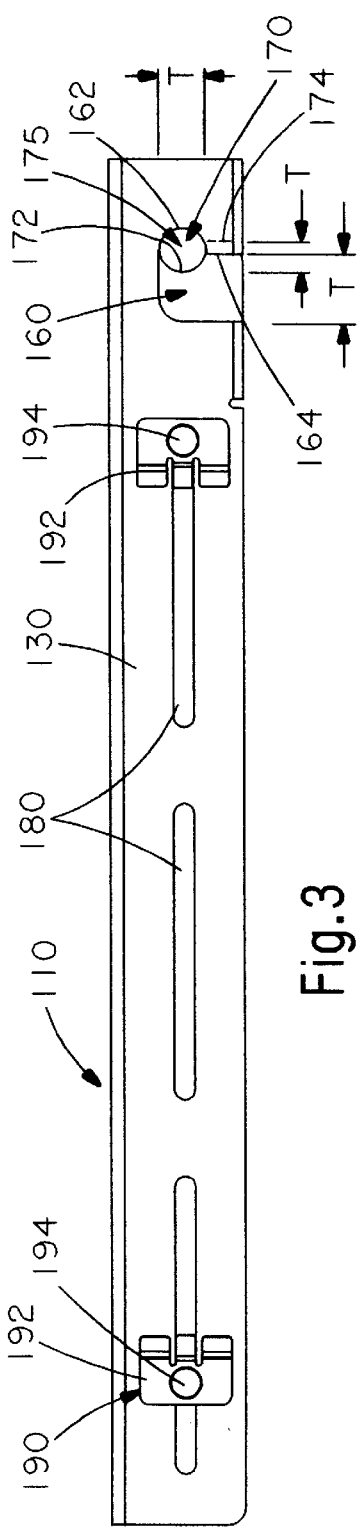
FIG. 3 is a top view of the support bracket of FIG. 1.

Bracket 110 includes a generally planar horizontal support surface 130, a vertical surface 140 extending substantially perpendicular to the horizontal support surface, and a horizontal flange surface 150 extending from vertical surface 140 and substantially parallel with horizontal support surface 130. The vertical surface 140 acts as a connecting surface and a strengthening element that strengthens resistance to deflection due to loads applied to support surface 130. As shown in FIGS. 1 and 3, the vertical surface may taper along the longitudinal length of the bracket. Flange surface 150 is spaced from support surface 130 by a predetermined distance.

Figure 4:
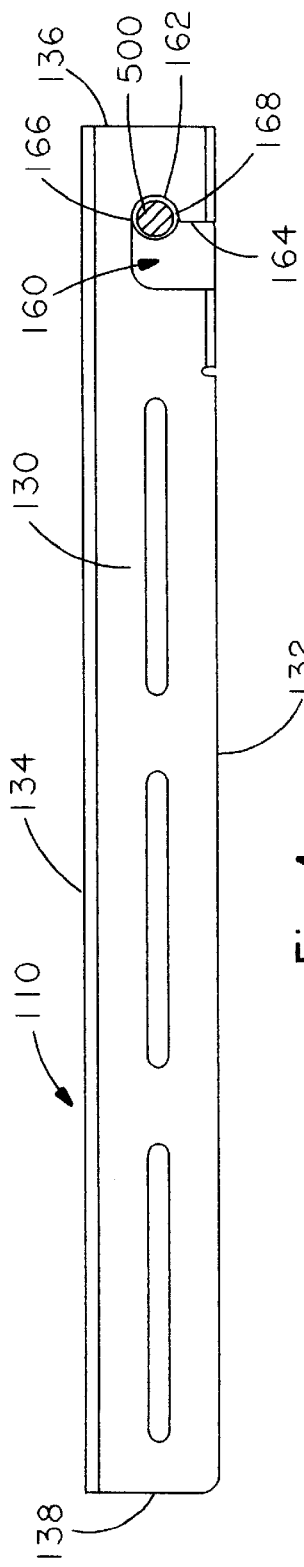
FIG. 4 is a cross-sectional view of FIG. 1 taken along lines IV—IV showing a horizontal support surface and flange opening of the support bracket (with the nuts omitted for clarity)
Figure 5:
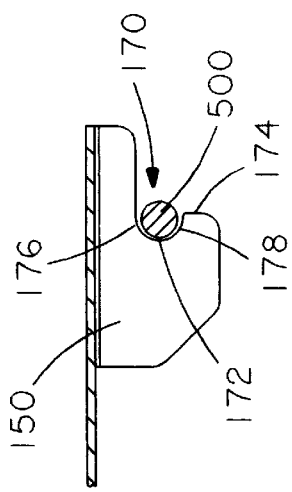
FIG. 5 is a cross-sectional view of FIG. 1 taken along lines V—V showing a horizontal flange surface and flange opening of the support bracket.

As best shown in FIGS. 3–5, surface 130 includes longitudinal edges 132, 134 and opposing ends 136, 138. End 136 includes an opening 160, preferably an "L" shaped flange opening, extending inward from longitudinal edge 132. Opening 160 has a width T that is equal to or slightly larger than the diameter of threaded rod 500. The same end of horizontal flange surface 150 includes an elongated opening 170 also sized to receive rod 500 by having a width that is equal to or slightly larger than rod 500. Opening 170 extends inward from an edge of surface 150 corresponding to edge 132 of surface 130.

A rear edge 162 of opening 160 forms a contact surface and is preferably contoured to match the diameter of rod 500. A front edge 172 of opening 170 also forms a contact surface and is preferably contoured to match the diameter of rod 500. Opening 160 is preferably "L" shaped, by forming a protruding flange portion 164 that extends beyond rear edge 162 towards opposite end 138. Opening 170 is partially defined by a protruding flange 174 that extends outwardly from rear edge 172 in the direction of end 136.

When openings 160 and 170 are superposed (see FIG. 3), a through hole 175 is formed sized to receive rod 500. Preferably, this through hole 175 has sides of width T that are equal to or slightly larger than the diameter of rod 500. This through hole is defined by edge surfaces 162, 166, 168, 172, 176 and 178 that bound rod 500 on four sides. These edge surfaces constrain or prevent movement of rod 500 in the plane of horizontal support surface 130.

As best shown in FIG. 3, one or more mounting openings 180 are provided through a top surface of support bracket 110 for receiving one or more mounting clamps 190 that retain a section of cable duct raceway onto the bracket. To accommodate various sizes of raceway and to allow adjustability, mounting openings 180 are preferably slotted as shown. Mounting clamps 190 are shaped with a flange surface 192 that mates with a corresponding flange 210 on duct raceway sections 200. Mounting clamps 190 are adjustably affixed onto bracket 110 by mounting screws 194 that either thread into opening 180 or are retained by nuts (unshown) positioned on a back side of bracket 110. Mounting clamps 190 are preferably preassembled onto bracket 110. A preferred clamp is the clamp found on QUIK-LOCK™ mounting bracket part nos. FR6TRBE12, FR6TRBE58, FR6TRBN12 or FR6TRBN58, available from Panduit Corporation, Tinley Park, Ill.

Bracket assembly 100 is mountable onto a midsection of rod 500 without requiring any removal of any support structure hardware. As such, this bracket assembly can be retrofitted onto existing installations readily. Installation will be described with reference to FIGS. 6–7. To position bracket 110 on the rod 500, bracket 110 is tilted up as shown at a suitable angle, such as 30°. This permits rod 500 to enter the top and bottom openings 160 and 170 through side 132 as shown in FIG. 6. When the support bracket 110 is lowered, rod 500 abuts the rear edge 162 of opening 160 and the front edge 172 of opening 170 as shown in FIG. 7 with the support bracket 110 extending substantially perpendicular to rod 500. Once positioned, hex nuts 120 are tightened against bracket 110, one above horizontal support surface 130 and one below horizontal support surface 130, to removably affix the bracket to the rod. As rod 500 passing through the through hole 175 of support bracket 110 is bounded on four sides by contact edges, bracket 110 is restricted from movement in the plane of the bracket. Thus, even if the hex nuts are not tight, removal of bracket 110 can be prevented.

When a retrofit installation is desired, hex nuts 120 may be conventional split nuts that can be installed mid-length along the rod without disassembly. Split nuts have a slit down one side sufficient to allow rod 500 to pass therethrough.

In the case of a vertically oriented rod 500, this provides a horizontally extending support bracket 110 as shown. To achieve the perpendicular extending support bracket, the rear edge 162 of flange opening 160 is laterally offset from the front edge 172 of flange opening 170 by a width T that corresponds to the diameter of rod 500, such as ½" or ⅝" for exemplary rods, as shown in FIG. 3. If an upward tilt of the bracket 110 versus the rod 500 is desired, this is achieved by having the rear edge 162 of flange opening 160 be laterally offset from the front edge 172 of flange opening 170 by a width that is less than the diameter of rod 500.

This arrangement provides additional support and resists bending moments acting on the bracket due to the weight of the bracket and load. That is, a conventional straight bracket is supported only at the nuts and the material selection and thickness must be sufficiently rigid to resist bending moments acting on the bracket. However, by providing the vertical surface 140, rigidity of horizontal support surface 110 can be increased. Moreover, by locating flange 150 and opening 170 spaced from surface 110, the resultant structure distributes the load more equally and resists bending and rotation of the support bracket about the axis of rod 500. Moreover, by provision of the through hole 175 being bounded on four sides by contact surfaces, bracket 110 can be prevented from laterally moving relative to rod 500, even if hex nuts 120 are not completely locked against bracket 110.

While the bracket assembly is preferably used with a threaded rod and hex nuts in the exemplary embodiments illustrated, the invention is not limited to such. Many of the advantages of the invention can be achieved by using the bracket on a nonthreaded rod having a support element with a diameter greater than the through hole on which the support surface of the support bracket may rest. As the through hole makes four side contact with the rod, lateral movement of the bracket relative to the rod is still retained and the combination of rear contact surface and front contact surface provide support to resist bending of the bracket assembly due to load forces acting on the bracket. Moreover, by the enlarged support element, downward movement of the bracket along the rod can be prevented.

While the invention has been shown and described in conjunction with specific exemplary embodiments, the invention is not limited to these. It will be obvious to those skilled in the art that changes and modifications may be made without departing from the teachings of this invention and that the matter set forth in the foregoing description and accompanying drawings is offered by way of illustration only and not as a limitation. The actual scope of the invention is intended to be defined in the following appended claims.

What is claimed is:

1. A bracket assembly mountable on a rod and providing a support surface for an object, comprising:
   a support bracket having
      a substantially planar support surface of a predetermined length with two longitudinal edges and two ends,
      a substantially planar flange surface substantially parallel to and spaced from the support surface, the flange surface having a longitudinal edge on a same side as a first longitudinal edge of the support surface,
      a connecting surface that connects the support surface and the flange surface,
      a first opening provided on the planar support surface near one of the two ends, the first opening extending inward from the first longitudinal edge of the support surface and sized to receive a rod having a predetermined width, the first opening defining at least a rear contact surface and a side contact surface, and
      a second opening provided on the flange surface, the second opening extending inward from the longitudinal edge of the flange surface and sized to receive the rod, the second opening defining at least a front contact surface and a side contact surface,
      the first and second openings being at least partially overlapping to define a through hole sized to receive the rod; and
   a support element sized larger than the through hole fixedly positioned on the rod, the support bracket resting on the support element.

2. The bracket assembly of claim 1, wherein the rod is threaded and the support element is a threaded nut.

3. The bracket assembly of claim 2, wherein the threaded nut is a split nut.

4. The bracket assembly of claim 2, further comprising a second nut provided on the rod that abuts the horizontal support surface.

5. The bracket assembly of claim 1, wherein the rod is cylindrical and has a predetermined diameter.

6. The bracket assembly of claim 5, wherein the through hole is cylindrical and the diameter of the through hole is substantially the same as the rod.

7. The bracket assembly of claim 5, wherein the through hole has a width of approximately ½".

8. The bracket assembly of claim 5, wherein the through hole has a width of approximately ⅝".

9. The bracket assembly of claim 1, wherein the horizontal support surface includes a mounting clamp.

10. The bracket assembly of claim 9, wherein the mounting clamp is adjustably positionable along the length of the horizontal support surface.

11. The bracket assembly of claim 10, wherein the support surface includes at least one slot along which the mounting clamp is adjustably positionable.

12. The bracket assembly of claim 9, wherein the mounting clamp includes a flange that mates with a corresponding flange on an object being supported by the bracket assembly.

13. The bracket assembly of claim 1, wherein the first opening is substantially "L" shaped.

14. A support bracket assembly mountable on a rod, comprising:
   a support bracket having
      a substantially planar support surface of a predetermined length with two longitudinal edges and two ends, the horizontal support surface including a flanged mounting clamp that mates with a corresponding flange on object to be supported thereon,
      a substantially planar flange surface substantially parallel to and spaced from the support surface, the flange surface having a longitudinal edge on a same side as a first longitudinal edge of the support surface,
      a connecting surface that connects the support surface and the flange surface,
      a first opening provided on the planar support surface near one of the two ends, the first opening extending inward from the first longitudinal edge of the support surface and sized to receive a rod having a predetermined width, the first opening defining at least a rear contact surface and a side contact surface, and
      a second opening provided on the flange surface, the second opening extending inward from the longitudinal edge of the flange surface and sized to receive the rod, the second opening defining at least a front contact surface and a side contact surface,
      the first and second openings being at least partially overlapping to define a through hole sized to receive the rod, the through hole being defined by contact surfaces that border four sides of the rod; and
   a support element sized larger than the through hole fixedly positioned on the rod, the support bracket resting on the support element.

15. The bracket assembly of claim 14, wherein the rod is threaded and the support element is a threaded nut.

16. The bracket assembly of claim 15, wherein the threaded nut is a split nut.

17. The bracket assembly of claim 15, further comprising a second nut provided on the rod that abuts the horizontal support surface.

18. The bracket assembly of claim 14, wherein at least two mounting clamps are provided that retain a flange of an object to be supported therebetween.

19. The bracket assembly of claim 14, wherein the support surface further includes at least one slot along which the mounting clamp is adjustably positionable.

20. A support bracket assembly mountable on a threaded rod for supporting and affixing a cable duct raceway section thereon, comprising:
   a support bracket having
      a substantially planar support surface of a predetermined length sufficient to receive a cable duct raceway section thereon, the support surface including two longitudinal edges and two ends, the horizontal support surface further including a flanged mounting clamp that mates with a corresponding flange on the cable duct raceway section to affix the raceway section thereto,
      a substantially planar flange surface substantially parallel to and spaced from the support surface, the flange surface having a longitudinal edge on a same side as a first longitudinal edge of the support surface,
      a connecting surface that connects the support surface and the flange surface,
      a first opening provided on the planar support surface near one of the two ends, the first opening extending inward from the first longitudinal edge of the support surface and sized to receive a threaded rod having a predetermined width, the first opening defining at least a rear contact surface and a side contact surface, and a second opening provided on the flange surface, the second opening extending inward from the longitudinal edge of the flange surface and sized to receive the threaded rod, the second opening defining at least a front contact surface and a side contact surface, the first and second openings being at least partially overlapping to define a through hole sized to receive the rod, the through hole being defined by contact surfaces that border four sides of the rod; and a pair of split nuts sized larger than the through hole fixedly positioned on the threaded rod against opposite sides of the support bracket.

\* \* \* \* \*